Nov. 14, 1944.   E. A. ZADIG   2,362,684
GAME
Filed June 18, 1943
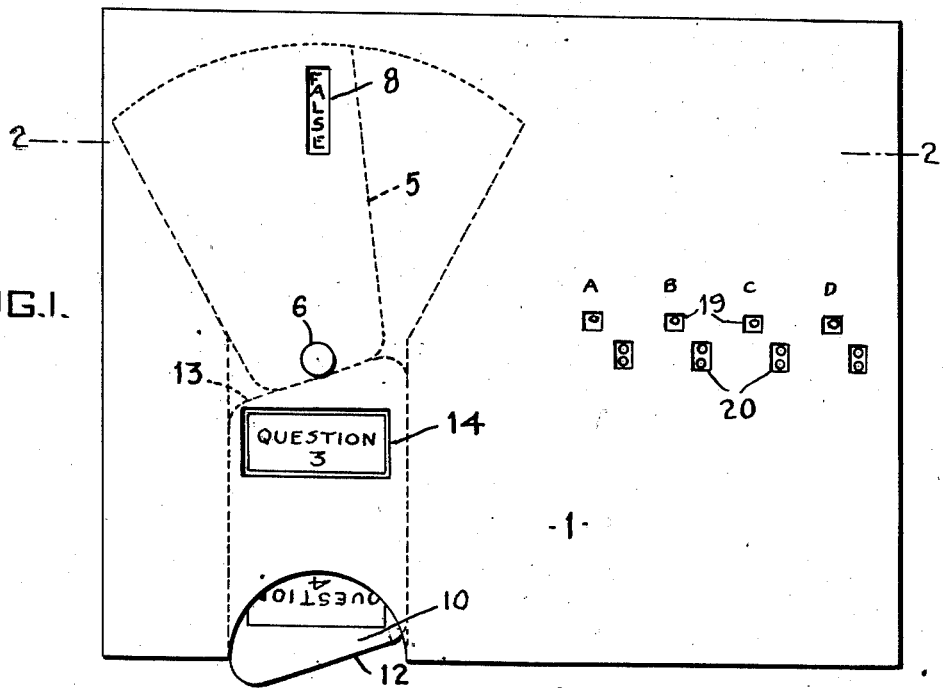
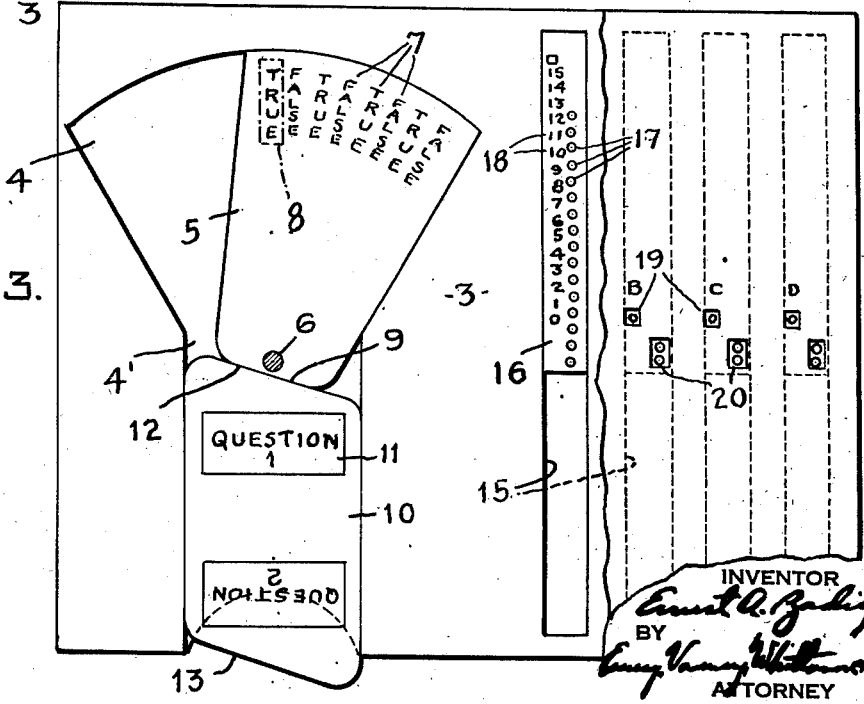

Patented Nov. 14, 1944

2,362,684

UNITED STATES PATENT OFFICE 2,362,684

GAME

Ernest A. Zadig, Norwalk, Conn.

Application June 18, 1943, Serial No. 491,331

2 Claims. (Cl. 35—22)

This invention relates to games.

It is an object of the invention to provide a game of an educational type involving the use of questions and an automatic indication of the appropriate answer.

Other objects and advantages of the invention will appear hereinafter.

A preferred embodiment of the invention selected for purposes of illustration is shown in the accompanying drawing, in which, Figure 1 is a plan view.

Figure 2 is a section on the line 2—2 of Figure 1.

Figure 3 is a view similar to Figure 1 with part of the top panel removed.

Referring to the drawing, a game board is provided comprising two parallel panels 1 and 2 spaced apart by a suitable spacer panel 3, the spacer panel being cut away, as shown, provides an open space 4 and a channel 4' communicating therewith and extending to one edge of the board. Within the space 4 between the panels 1 and 2 is an indicator 5 pivotally mounted at 6 on the panels in any suitable manner. Near the upper edge of the indicator 5 is printed suitable indicia 7. The words constituting such indicia are repeated several times and are placed on the indicator in such manner that any one of the separate words constituting such indicia may be exposed to view through the slot 8 in the panel 1.

The lower edge 9 of the indicator constitutes a cam edge by means of which the indicator may be caused to oscillate, as hereinafter explained, to expose an appropriate word of the indicia through the slot 8. In the embodiment illustrated the edge 9 is straight but terminates at each end in rounded corners for reasons hereinafter set forth.

Accompanying the game board, and cooperating therewith are a series of cards 10, one of which is illustrated. Each card has printed on its surface indicia 11 in the form of one or more questions, as for example in the card illustrated, there are four questions, two on one face of the card, at opposite ends thereof, and two on the other face of the card at opposite ends thereof. The two questions on the same face are printed in opposite directions, so that the card must be turned endwise for convenient reading of the questions.

The end edges 12 and 13 of the card constitute cam edges which are adapted to cooperate with the cam edge 9 to adjust the indicator to expose an appropriate word of the indicia through the slot 8, the edges 12 and 13 being cut at varying angles in order to make it difficult for the user to guess the appropriate answer by merely looking at the card. The cam edges 12 and 13 terminate in rounded corners which cooperate with the rounded corners of the indicator to provide a rolling action causing the indicator to move easily and to preclude any possibility of binding.

The questions on the cards may be phrased in any suitable manner, and the indicia 7 on the indicator are related thereto to provide appropriate answers. For example, the questions may be phrased in the form of statements, as "The Mississippi river flows south," in which case the indicia 7 may be in the words "True" or "False" as illustrated. Or the question may be phrased as "Does the Mississippi river flow west," in which case the indicia 7 may be in the words "Yes" or "No."

In using the game, the player picks up a card, reads a question and announces his answer, as "True" or "False" or "Yes" or "No" as the case may be. He then inserts the card endwise into the channel 4' between the panels 1 and 2, the card being guided by the edges of the spacer panel 3. When the cam edge 12 comes in contact with the cam edge 9, the indicator is turned to expose an appropriate answer through the slot 8. The player's announced answer is thus proven right or wrong. The same process may be repeated with the other question on the same card, turning the card to bring the question to the proper position, or another card may be used. If desired the panel 1 may be provided with an aperture 14 located in position to expose the question under consideration.

The game may be played by any number of players and a suitable scoring device may be incorporated in the game board, if desired. For example, at one side of the indicator the spacer panel 3 may be cut away to provide several parallel channels 15 in which are mounted slides 16. Each slide may be provided with a row of perforations 17 along one side and a series of numerals 18 along the other side. The panel 1 is provided with offset apertures 19 and 20, the apertures 19 being located to expose a single numeral and the aperture 20 being located to expose a pair of perforations 17. As each player in turn answers a question correctly, he inserts a pencil through the aperture 20 of his scoring slide and moves the slide down one space by engaging the pencil in one of the perforations 17, thus exposing a numeral through the aperture 19 which indicates the total number of correct answers. If desired, the players may be required to move their slides in the opposite direction when an incorrect answer is given.

It will be understood that the invention may be variously modified and embodied within the scope of the subjoined claims.

I claim as my invention:

1. A game board, comprising upper and lower panels, a spacer panel therebetween, said spacer panel being cut away to provide an open space between said upper and lower panels and a channel communicating therewith and extending between said upper and lower panels from said open space to one edge of the board, a pivotally mounted indicator located in said open space, said indicator having a cam edge opposite said channel, said indicator having indicia printed thereon in the form of words indicating appropriate answers to questions, and a card adapted to be inserted in said channel, said card having indicia printed thereon in the form of a question appropriate to one of the answers, said card having a cam edge engaging the came edge of said indicator to move said indicator to a position such that the indicia on the indicator indicates the appropriate answer to the question on the card.

2. A game board, comprising a panel, an indicator movably mounted thereon, said indicator having indicia printed thereon in the form of words indicating appropriate answers to questions, said indicator having a cam edge, a card having a cam edge adapted to engage the cam edge of said indicator, said card having indicia printed thereon in the form of a question appropriate to one of the answers, the cam edge of said card being so shaped as to move said indicator on engagement therewith to a position to indicate the appropriate answer to the question on the card.

ERNEST A. ZADIG.